Oct. 9, 1956 — L. E. ELFES — 2,765,937
UNLOADING MECHANISM FOR TRAILERS
Filed May 7, 1954 — 7 Sheets-Sheet 1

Fig. 1.

INVENTOR.
Lee E. Elfes
BY
Carlson, Pitzner, Hubbard & Wolfe
Atty's

Oct. 9, 1956 L. E. ELFES 2,765,937
UNLOADING MECHANISM FOR TRAILERS
Filed May 7, 1954 7 Sheets-Sheet 3

INVENTOR.
Lee E. Elfes
BY
Carlson, Pitzner, Hubbard & Wolfe
Atty's

Oct. 9, 1956

L. E. ELFES 2,765,937

UNLOADING MECHANISM FOR TRAILERS

Filed May 7, 1954

INVENTOR.
Lee E. Elfes
BY
Carlson, Pitzner, Hubbard & Wolfe
Atty's

Oct. 9, 1956 L. E. ELFES 2,765,937
UNLOADING MECHANISM FOR TRAILERS
Filed May 7, 1954 7 Sheets-Sheet 5

INVENTOR.
Lee E. Elfes
BY
Carlson, Pitzner, Hubbard & Wolfe
Atty's

INVENTOR.
Lee E. Elfes
BY
Carlson, Pitzner, Hubbard & Wolfe
Atty's

Oct. 9, 1956  L. E. ELFES  2,765,937
UNLOADING MECHANISM FOR TRAILERS
Filed May 7, 1954  7 Sheets-Sheet 7

INVENTOR.
BY Lee E. Elfes
Carlson, Pitzner, Hubbard & Wolfe
Att'ys

United States Patent Office 2,765,937
Patented Oct. 9, 1956

2,765,937

UNLOADING MECHANISM FOR TRAILERS

Lee E. Elfes, Detroit, Mich., assignor to Harry Ferguson, Inc., Detroit, Mich., a corporation of Delaware Application May 7, 1954, Serial No. 428,237

6 Claims. (Cl. 214—83.36)

This invention relates to trailers adapted to be hitched to tractive vehicles such as farm tractors. The invention is useful in, and has been exemplified as embodied in, a trailer of the two-wheeled, forwardly over-balanced type in which a portion of the weight carried by the tractor is applied to the tractor's rear wheels so as to increase the traction between the wheels and the ground. The present invention is, however, also applicable in a number of its aspects to other types of trailers.

An object of the invention is to provide a trailer having an improved conveyor for moving materials along the bed of the trailer. In this connection it is a further and more particular object to provide a trailer of the foregoing character in which the conveyor is provided with an improved driving mechanism so arranged that the speed of the conveyor may be varied or the conveyor stopped altogether. A still further object is to provide a trailer having a conveyor drive arranged so that a pawl which is oscillated at a constant frequency and amplitude will drive a ratchet wheel at any one of a plurality of selected speeds.

Another object of the invention is to provide a trailer having an improved arrangement for mounting floor boards or members on the trailer bed.

It is another object of the invention to provide a trailer in which the hitching tongue and the frame are interconnected in an improved manner.

Another object of the invention is to provide a trailer having an improved brake system, and in particular an improved brake actuator or lever arrangement.

Still another object of the invention is to provide a trailer having a readily attachable and detachable conveyor so that the conveyor may be marketed as an attachment for the basic trailer. A further object in this connection is to provide a trailer having readily attachable and detachable side boards so that the trailer may be employed either as a flat bed trailer or a box type trailer.

Further objects and advantages will appear from consideration of an illustrative embodiment of the invention, as disclosed in the following description, taken with the accompanying drawings, in which.

While a particular embodiment of the invention has been shown in the drawings and will now be described in some detail, there is no intention to limit the invention to the details of the embodiment. On the contrary, the invention is intended to embrace all modifications, alternative constructions, usages and equivalents which fall within the spirit and scope of the invention as expressed and defined in the specification and the appended claims.

The illustrative trailer, embodying the invention, is shown attached to a tractor 20 of the well-known Ferguson make, equipped with a hydraulic power lift device. While the trailer may be hitched up to any suitable type of tractor, it may be convenient, by way of introduction, to describe the pertinent features of the illustrated tractor.

Reference may be had to the Ferguson Patent No. 2,118,180 for a complete disclosure of the tractor 20. However, for the present it will suffice to note that the tractor 20 is equipped with a pair of trailing draft links 21 having their front ends swingably mounted on pivots 22 connected to a center housing 23 on the tractor. Extending from the center housing 23 are axles 24 and axle housings 25 which support rear wheels 26. It will be noted that the pivots 22 are located below and slightly forward of the center line of the axles 24. To raise and lower the draft links 21, the tractor is provided with a hydraulic power lift device 28 including crank arms 29 connected to the links 21 by means of drop links 30. A hydraulic ram (not shown) is provided to elevate the crank arms 29, the descent of the links 21 and the crank arms being by gravity.

Figure 1:
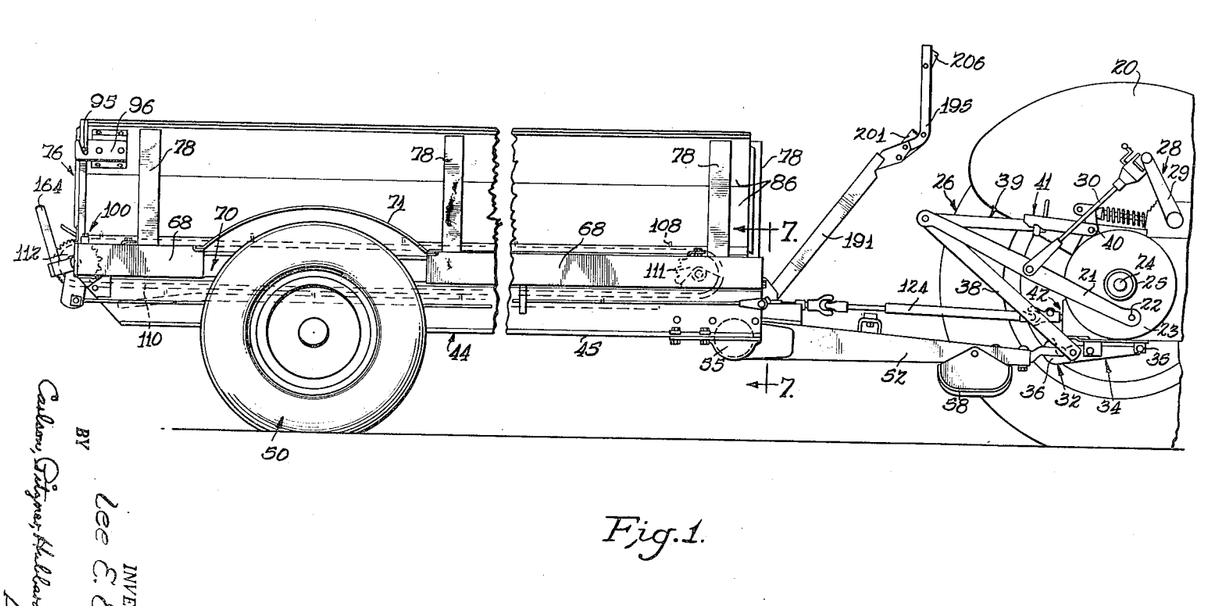
Figure 1 is a general side elevational view of a trailer which will serve to illustrate the invention, the trailer being shown as attached to a well-known tractor which is illustrated in fragmentary fashion.

In this instance, the illustrated tractor is shown equipped with a trailer hitch 32 of the type disclosed and claimed in the copending Lee E. Elfes application Serial No. 412,446, filed February 25, 1954, to which reference may be had for a complete disclosure. For the present, however, it will suffice to note that the hitch 32 includes a hitch link 34 having its front end connected to a pivot 35 mounted on the underside of the center housing 23. At its rear end, the hitch link 34 is provided with an upwardly extending hook 36. To provide for raising and lowering the hitch link 34, the draft links 21 are connected to the link 34 by means of a pair of tension links 38. It will be evident that the links 34 and 38 thus constitute a linkage adapted to jack-knife downwardly when the draft links 21 are lowered. In this way, the hook 36 may be dropped down to a position near the ground so that the trailer may readily be hitched up. Raising the links 21 will elevate the hook 36 to the position shown in Fig. 1, immediately beneath the center housing 23. To hold the hitch link 34 in this position, the hitch may be provided with a telescopic upper link 39 connected between the rear ends of the draft links 21 and a pivot pin 40 mounted on the upper portion of the center housing 23. A manually releasable latching mechanism 41 is embodied in the upper link 39 to prevent extension of the link 39 from its fully contracted position and thereby hold the hitch link 34 in its elevated position, independently of the operation of the hydraulic lift device 28.

The tractor is equipped with a suitable power take-off shaft 42 journaled in the lower part of the center housing 23.

Figure 2:
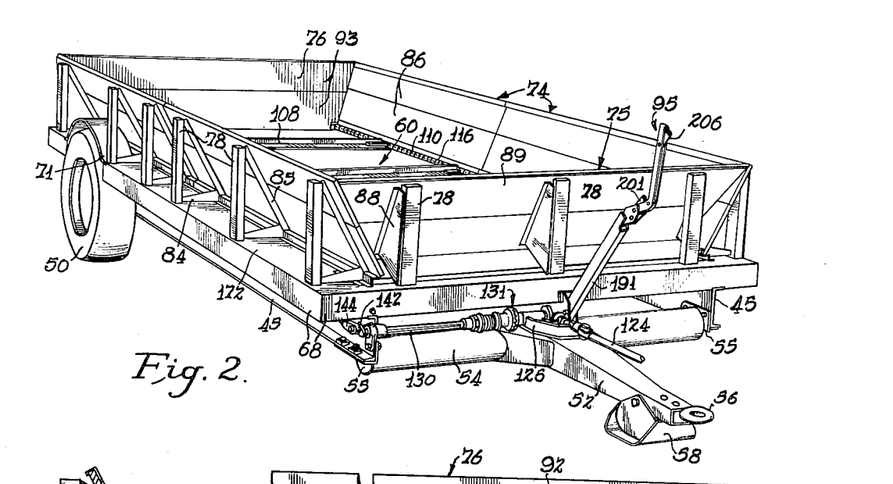
Fig. 2 is a general front perspective view of the trailer.
Figure 3:
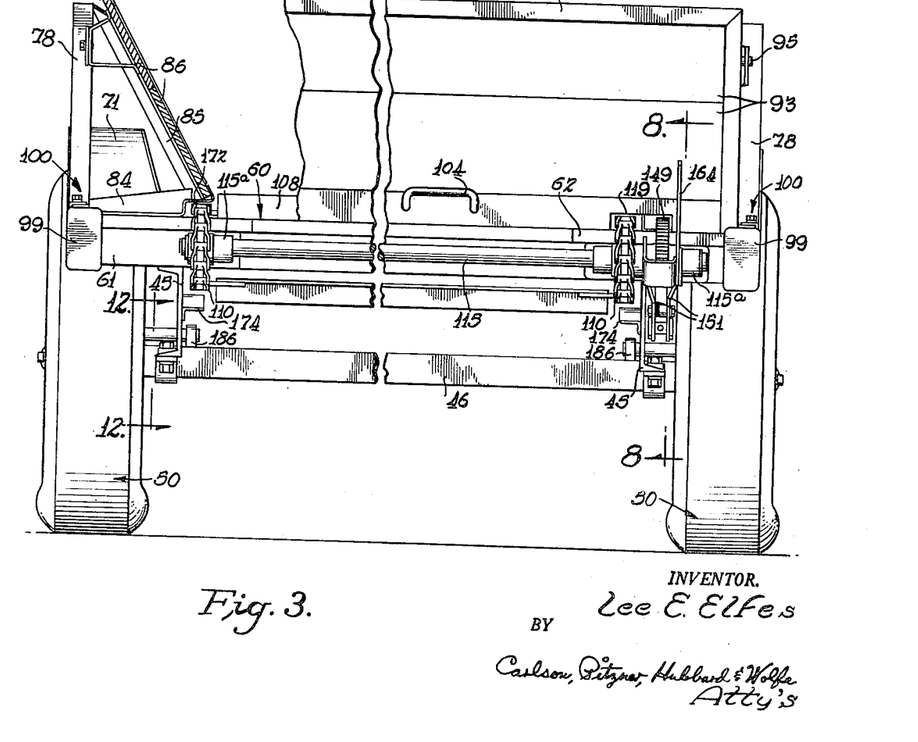
Fig. 3 is an enlarged rear elevational view of the trailer with a portion of the tail board broken away to reveal details of one removable side board and a conveyor mechanism.
Figures 11, 12:
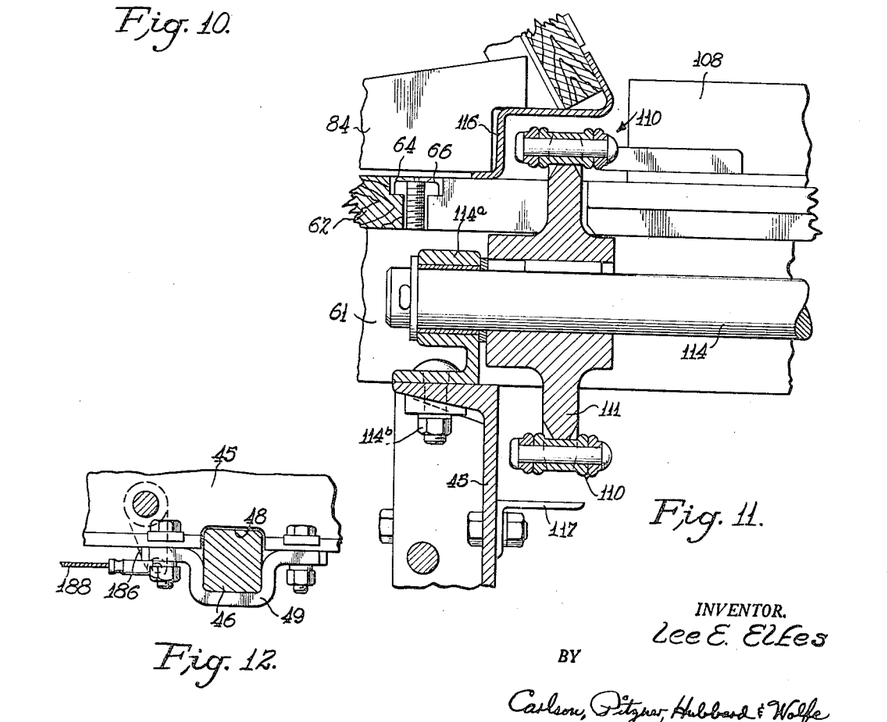
Fig. 11 is a fragmentary elevational sectional view taken along a line 11—11 in Fig. 10.
Fig. 12 is an enlarged fragmentary elevational sectional view taken generally along a line 12—12 in Fig. 3.

The illustrated trailer embodying the present invention is provided with a strong and rigid frame 44 which nevertheless is simple, inexpensive and light in weight. Included in the frame are two laterally spaced longitudinally extending metal beams 45 (Figs. 1–3), which in this instance are channel shaped in cross section. A rear axle 46 for the trailer is mounted in notches 48 formed in the beams 45 adjacent their rear ends and is secured in place by means of clamps 49 as shown in Fig. 12. Rear wheels 50 are rotatably mounted on the opposite ends of the axle 46.

To hitch the trailer to the tractor, the frame 44 is equipped with a forwardly tapering metal hitching tongue 52, which preferably is of hollow box section, welded or otherwise secured at its rear end to a rigid tubular metal cross member 54 secured between the front ends of the longitudinal beams 45 by means of brackets 55. At its front end, the tongue 52 is fitted with a metal eye or hitch ring 56 adapted to be hitched to the hook 36 on the trailer hitch 32. A skid or foot 58 is mounted on the tongue 52 adjacent the hitch ring 56 to support the latter in an elevated position so that the hook 36 may be moved under the hitch ring simply by backing up the tractor into position.

Figure 4:
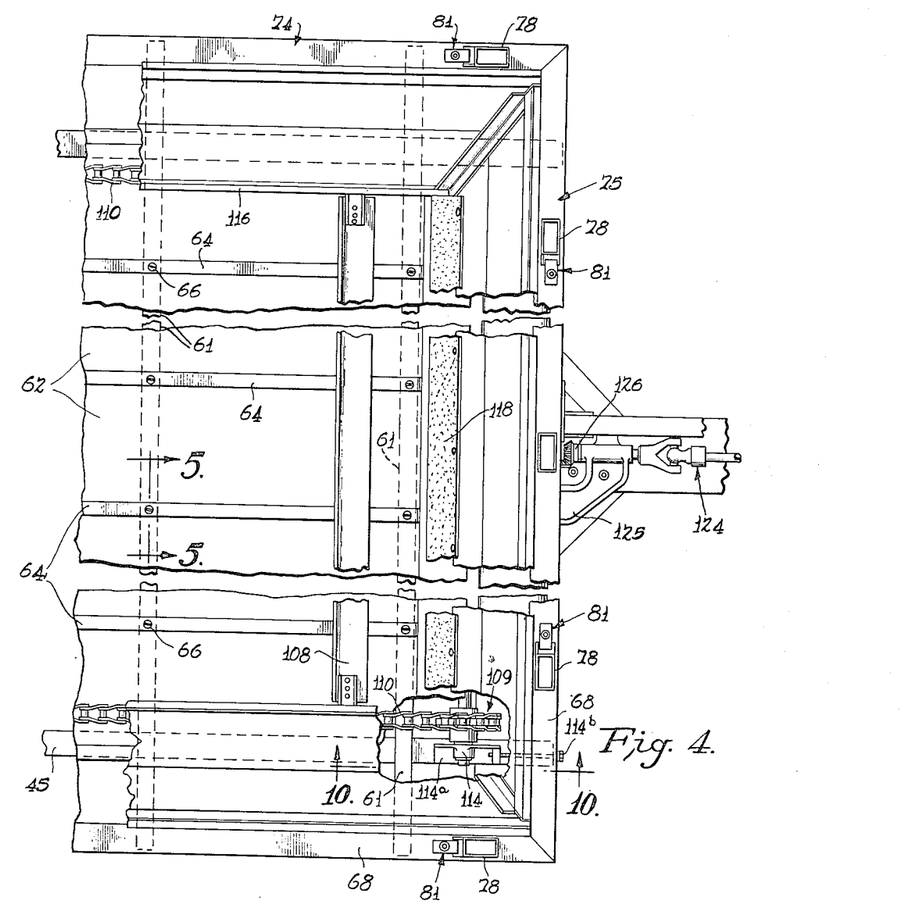
Fig. 4 is an enlarged fragmentary plan view showing the front portion of the trailer.
Figure 5:
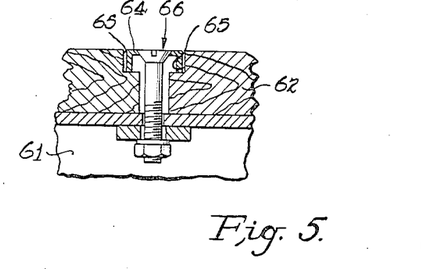
Fig. 5 is an enlarged fragmentary vertical sectional view taken along a line 5—5 in Fig. 4.

To provide a load support, the trailer is provided with a bed 60 comprising a plurality of metal cross beams 61 (Figs. 3–5), illustrated as being of channel-shaped cross section, welded or otherwise secured to the upper edges of the longitudinal beams 45 and extending between and laterally somewhat beyond the longitudinal beams.

Provision is made for securing a plurality of wood floor boards or members 62 to the cross beams 61. In this instance, the floor boards 62 extend longitudinally and are held in place on the cross beams 62 by means of metal anchoring members or bars 64 which are received in recesses or grooves 65 formed in the upper edges of the boards 62. As illustrated, the anchoring bars 64 are channel-shaped in cross section and are arranged with their flanges directed downwardly so that the bars 64 will be flush with the upper surfaces of the boards 62. It will be seen that the floor boards 62 are spaced apart laterally so that fasteners such as the illustrated bolts 66 may extend downwardly between the adjacent boards 62 to secure the anchoring bars 64 to the cross beams 61. The channel-shaped anchoring bars 64 will seal the spaces between the boards 62 and thereby prevent the escape of any loose material from the trailer.

To cover and protect the edges of the floor boards 62, a plurality of metal border channels 68 are arranged around the front and side edges of the trailer bed 60. The front border channels 68 may be secured to the main longitudinal beams 45, while the side border channels may be secured to the ends of the cross beams 61. Notches 70 may be formed in the bed 60 to provide clearance for the wheels 50, and fenders 71 may be mounted on the bed to cover the wheels.

With only the structure thus far described, the trailer may very advantageously be employed for hauling hay bales, cotton bales, vegetable baskets, or similar loads for which a flat bed trailer is desirable because of its maximum load supporting area. Thus the structure described above may be marketed as a basic flat bed trailer unit.

To adapt the trailer for hauling loose materials such as grain, hay, or manure, a set of side boards or panels may be provided to form a complete box when mounted on the bed 60. In the case of the illustrated trailer, two side boards 74 are detachably mounted end-to-end on each side of the trailer, while a front board 75 and a tail board 76 are detachably mounted at the front and rear of the bed 60, respectively.

Figure 6:
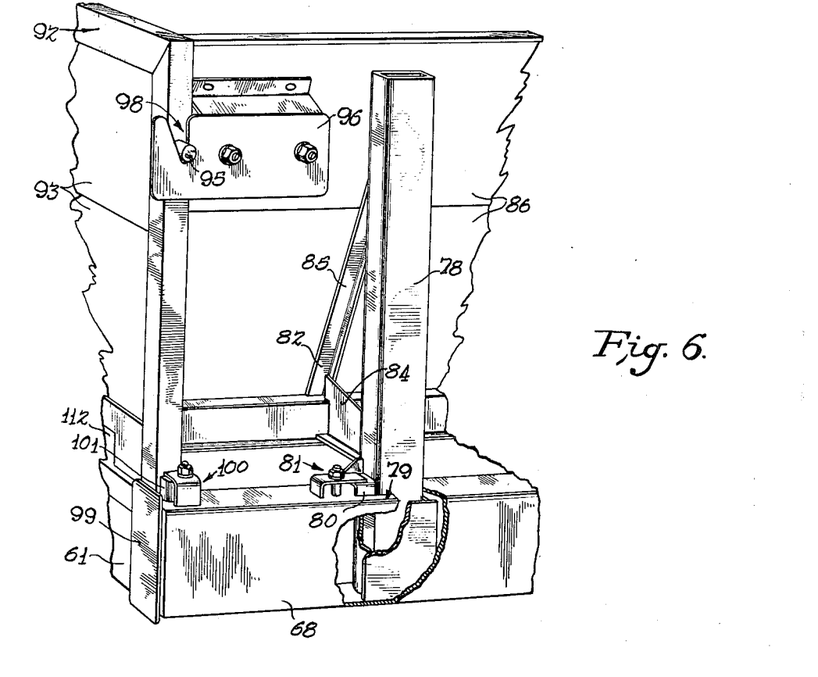
Fig. 6 is an enlarged fragmentary perspective view showing the rear right hand corner of the trailer with certain parts broken away.

To provide for the detachable mounting of the panels on the bed 60, the side boards 74 and front board 75 are provided with spaced, rectangular tubular metal uprights 78 adapted to be inserted into rectangular sockets 79 formed in the border channels 68. Each of the uprights 78 has a Z-shaped stop or lug 80 (Fig. 6) which may be held against the upper edge of the border channel 68 by means of a releasable clamp 81. Each upright 78 on the side boards 74 is provided with a triangular metal bracket 82 comprising a generally horizontal angle member 84 and a slanting angle member 85. Wood planks 86 are suitably secured to the slanting members 85. In the case of the front board 75 each upright 78 is provided with a flanged one-piece triangular metal bracket 88 to which wood planks 89 are secured.

The tail board 76 is made with a simple rectangular angle iron frame 92 to which planks 93 are secured. In order that the tail board 76 may readily be removed from the trailer, a pair of pins 95 (Fig. 6) are arranged to extend laterally from an upper location on the respective ends of the tail board frame 92. A pair of brackets 96 are mounted at the rear of the side boards 74, each bracket having an upwardly opening generally V-shaped notch or slot 98 adapted to receive, with a locating, camming action, one of the pins 95. To prevent the lower edge of the tail board 76 from moving rearwardly, upwardly projecting stops in the form of plates 99 are secured to the rear ends of the border channels 68 in position to engage the rear face of the tail board 76 adjacent its lower corners. In order to lock the tail board 76 in place when conditions so require, a clamp 100 is mounted on each border channel 68 adjacent the corresponding stop 99 and is adapted to engage a laterally projecting lug 101 on the frame 92 of the tail board 76. Each clamp 100 may be rotated into or out of cooperative position with the lugs about its mounting bolt and locked in position by tightening a nut on the bolt. After first disengaging the clamps 100, a handle 104 may be used to lift the tail board 76 clear of the stops 99, and the pins 95 out of the brackets 96. A load of material may then be discharged off the rear end of the trailer. Replacement of the tail board is facilitated by the notched brackets, which cam the pins 95 forwardly as the tail board is lowered into engagement with the stops 99.

The trailer may be marketed complete with the side boards, if this is desired. On the other hand, the set of side boards may be marketed as an attachment for the flat bed trailer.

Provision may be made for selectively discharging the load from the trailer. For this purpose, the illustrated trailer is provided with a conveyor attachment 106 for moving the load rearwardly along the bed 60. In the illustrated arrangement, the conveyor attachment comprises a plurality of movable, transverse feeder slats or bars 108 (Figs. 1–3) which in this instance are made of angle iron. In order that the slats 108 may be moved rearwardly along the bed 60, the opposite ends of the slats 108 are secured to flexible conveyor elements in the form of two laterally spaced endless conveyor or roller chains 110, which are looped longitudinally around the bed 60 and extend upwardly through a slot 109 formed in the bed adjacent its front end. Each chain 110 runs on front and rear sprockets 111 and 112 (Figs. 8–11) mounted on front and rear sprocket shafts 114 and 115. Bearing blocks 115a, mounted on the rearmost cross beam 61, provide support for the rear sprocket shaft 115. The front sprocket shaft 114 is journaled in bearing blocks or brackets 114a which may be adjustably secured to the main longitudinal beams 45 by means of bolts 114b extending through slots 114c in the blocks 114a. Elongated adjusting bolts 114d may be arranged between the blocks 114a and the front border channels 68 so that any slack in the conveyor chains 110 may be taken up.

To guide the upper flights of the conveyor chains 110 and hold the slats 108 down against the bed 69, each side board 74 is provided at its lower edge with a longitudinal member 116 (Figs. 3 and 11) generally Z-shaped in cross section, which overhangs and shields the adjacent chain 110. The Z-shaped member 116 is welded or otherwise secured to the bracket members 84 and 85. Support for the lower flights of the conveyor chains 110 is provided by guide angles 117 extending longitudinally along the main longitudinal beams 45, immediately below the chains 110.

Loose materials are prevented from escaping through the slot 109 and are excluded from the sprockets and the conveyor driving mechanism by means of a flap 118 (Fig. 10) made of flexible material and secured to the front board 75. The conveyor slats 108 will readily push the flap 118 upwardly in passing around the front conveyor sprockets 111.

In order that the tail board 76 may be closed when the conveyor 106 is not in operation, notches 119 (Fig. 3) are formed in the lower edge of the tail board to afford clearance for the conveyor chains 110 and the rear sprockets 112.

Figure 7:
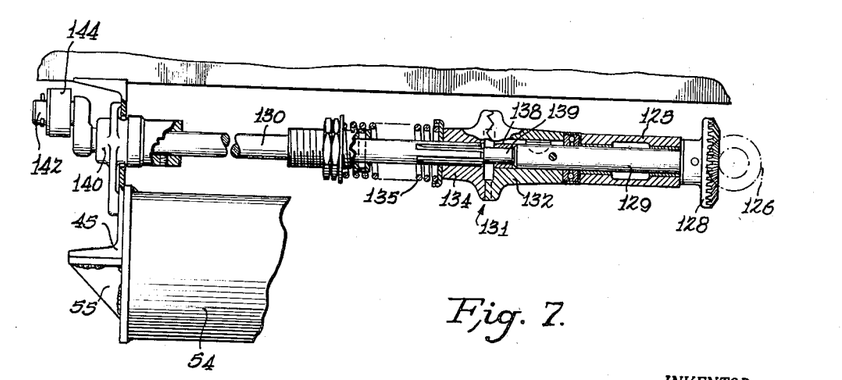
Fig. 7 is an enlarged vertical sectional view taken generally along a line 7—7 in Fig. 1 and showing a slip clutch, a crank and other elements for driving the conveyor embodied in the illustrative trailer.
Figure 8:
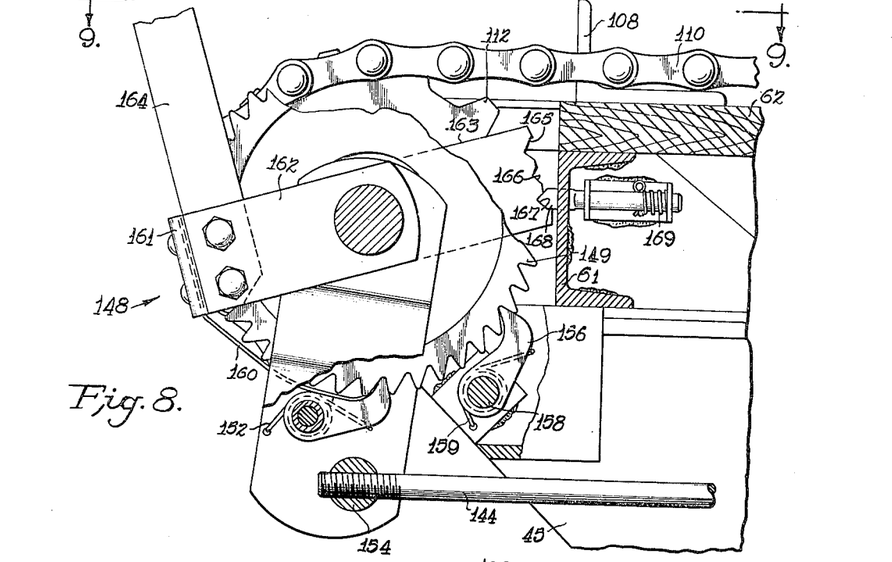
Fig. 8 is an enlarged fragmentary elevational sectional view taken generally along a line 8—8 in Fig. 3 and showing a speed selector mechanism for the conveyor drive on the trailer.
Figure 9:
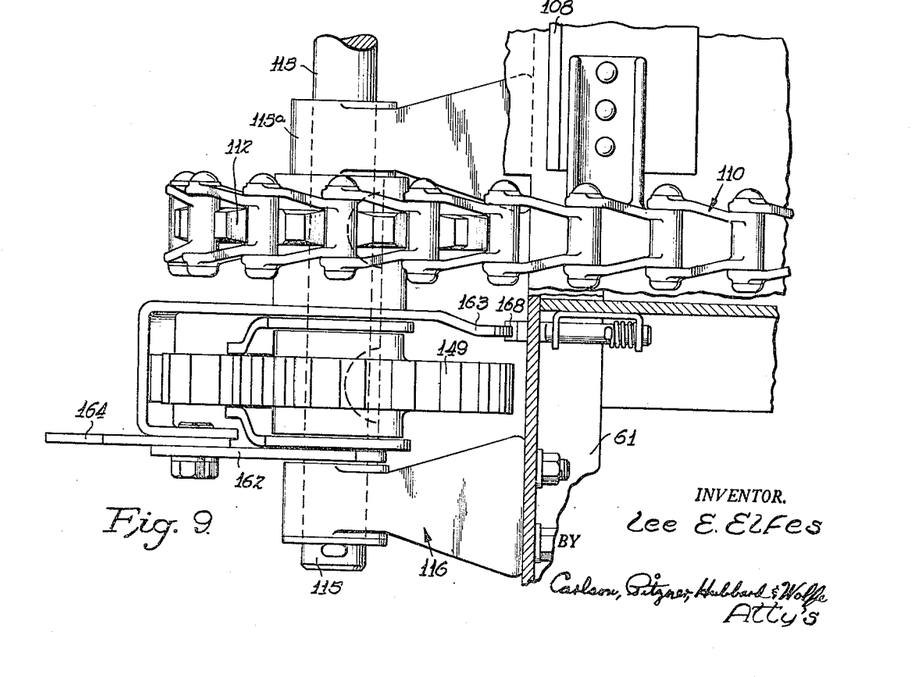
Fig. 9 is an enlarged horizontal sectional view of the speed selector mechanism, taken generally along a line 9—9 in Fig. 8.
Figure 10:
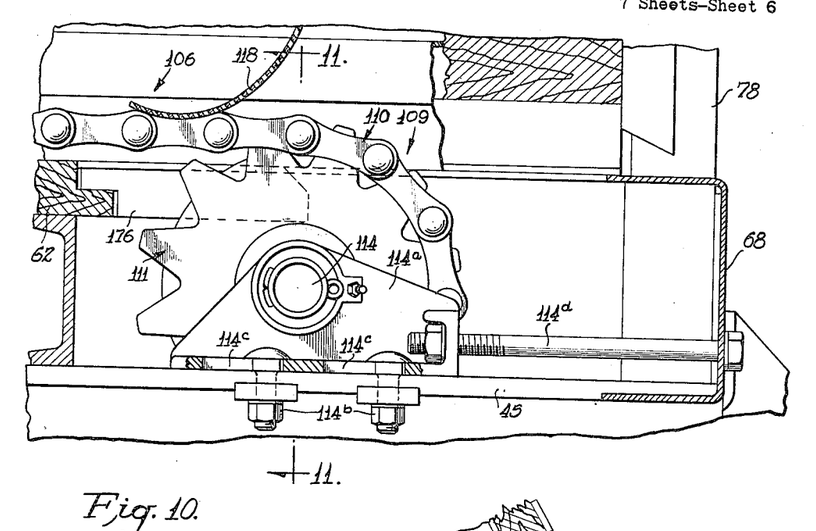
Fig. 10 is an enlarged fragmentary elevational sectional view taken along a line 10—10 shown in Fig. 4 and showing the front sprocket and other elements of the conveyor.

A driving connection is established between the conveyor 106 and the power take-off device on the tractor 20 by means of a suitable universally jointed extensible and contractible connecting shaft 124 (Fig. 1) adapted to be attached at its front end to the power take-off shaft 42 on the tractor 20. At its rear end, the shaft 124 is journaled in a bracket 125 secured to the tongue 52 of the trailer. Connected to the rear end of the shaft 124 is a bevel drive pinion 126 which meshes with a bevel gear 128 (Figs. 2 and 7) mounted on a transversely extending clutch shaft 129, also journaled in the bracket 125. A torque limiting connection is established between the shaft 129 and a crank shaft 130 by means of a slip clutch 131 (Fig. 7), comprising a pair of toothed jaws 132 and 134 urged into engagement by a spring 135. In this instance the jaw 132 is fixed to the clutch shaft 129 while the jaw 134 is splined on the crank shaft 130. It will be understood that the clutch 131 will slip if the conveyor is overloaded or jammed, so as to prevent damage to any component of the conveyor.

Support for one end of the crank shaft 130 is provided by a pilot bushing 138 (Fig. 7) mounted in the clutch jaw 132, so as to receive a reduced end portion 139 of the shaft 130. Adjacent its other end, the shaft 130 is journaled in a bearing 140 mounted on one of the longitudinal beams 45. This end of the shaft is equipped with a crank 142 to which a connecting rod or pitman link 144 is connected. The connecting rod 144 extends to the rear end of the trailer and is supported in one or more guide blocks 146 (Fig. 1) which prevent whipping of the rod.

At its rear end, the connecting rod 144 is arranged to operate a variable speed conveyor driving mechanism 148 (Figs. 8 and 9), which in this instance comprise a ratchet toothed element in the form of wheel 149 fixed on the rear sprocket shaft 115. The ratchet wheel 149 is driven by a ratchet pawl 150 pivoted on a pair of ratchet arms 151 which are pivotally suspended on the rear shaft 115 at opposite sides of the ratchet wheel. A spring 152 is provided to bias the pawl 150 toward the ratchet wheel 149. The connecting rod 144 is connected to the ratchet arms 151 by means of a pivot 154, the rod being threaded into the pivot to provide an adjustment of the position of the arms 151. Retrograde movement of the ratchet wheel 149 is prevented by means of a non-retrograde pawl 156 which is mounted on the fixed pivot 158 and is biased against the ratchet wheel by means of a spring 159.

As the crank 142 is rotated by the power take-off device on the tractor, the connecting rod 144 will be reciprocated and the ratchet arm 151 will be oscillated so that the ratchet pawl 150 may advance the ratchet wheel 149. In this instance, the angle of oscillation of the pawl 150 corresponds to the angular span of two teeth on the wheel 149.

Provision is made for adjusting the speed ratio of the drive formed by the ratchet wheel 149 and the ratchet pawl 150. To this end, a selector shield 160 is mounted in position to be moved between the ratchet pawl 150 and the ratchet wheel 149. In this instance the selector shield 160 is mounted on a U-shaped arm 161 having a pair of side members 162 and 163 straddling the ratchet wheel 149 and pivoted on the rear sprocket shaft 115. An upwardly extending handle 164 is connected to the arm 161. At its front end, the member 163 is provided with three detent notches 165, 166 and 167 engageable with a movable detent member 168 which is biased rearwardly by means of a spring 169. When shield 160 is adjusted to the position shown in Fig. 8, the ratchet pawl 150 will be withheld from the ratchet wheel 149 during substantially the entire oscillatory cycle of the ratchet arms 151. In this position, the detent member 168 will engage the lowermost notch 167, as shown. For this setting of the selector shield 160, the arms 151 will oscilllate idly without advancing the conveyor 106. If the shield is withdrawn somewhat by swinging the arm 161 in a clockwise direction so as to engage the detent member 168 with the notch 166, the ratchet pawl 150 will be allowed to engage the ratchet wheel 149 for approximately half of the oscillatory range of the arms 151, and the ratchet wheel will be advanced one tooth during each oscillation of the arms. In this setting, the conveyor will be driven at half speed. Full speed operation of the conveyor may be obtained by swinging the arm 161 still further clockwise so as to engage the detent member 168 with the uppermost notch 165, in which case the shield 160 will be withdrawn entirely from the pawl 150 so that the latter will engage the ratchet wheel 149 throughout the oscillatory range of the arms 151. The ratchet wheel 149 will then be advanced two teeth during each oscillatory cycle of the arms. The selector handle 164 is located in a position which will be convenient for an operator observing the discharge of the load from the trailer while standing at the rear end of the trailer.

It is a simple matter to detach the conveyor 106 from the trailer. This may be accomplished simply by disconnecting the chains 110 and removing the sprocket bearings 114a and 115a, the bracket 125, and the crankshaft bearing 140. Removal of the front sprocket bearing 114a and the front shaft 114 will be facilitated by removing a transverse floor board 176 (Fig. 10) located immediately to the rear of the front sprockets 111. To use the trailer without the conveyor, the transverse floor board 176 may be reinstalled or replaced with a somewhat wider board so as to close the slot 109. The flap 118 may be left in place or replaced with a metal shield.

Since the conveyor 106 is readily attachable and detachable, it may be marketed as a separate attachment. In this way, the farmer will be able to buy a trailer either with or without the conveyor, as he may desire. If the trailer alone is purchased, a conveyor attachment may be installed later on.

Figure 13:
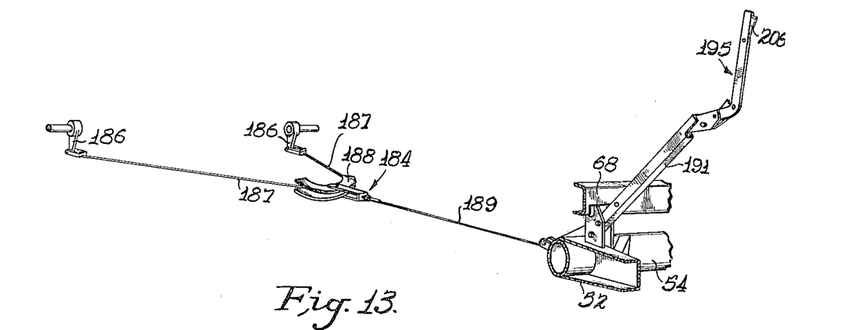
Fig. 13 is a diagrammatic perspective view showing certain details of the brake system for the trailer.
Figures 14, 15:
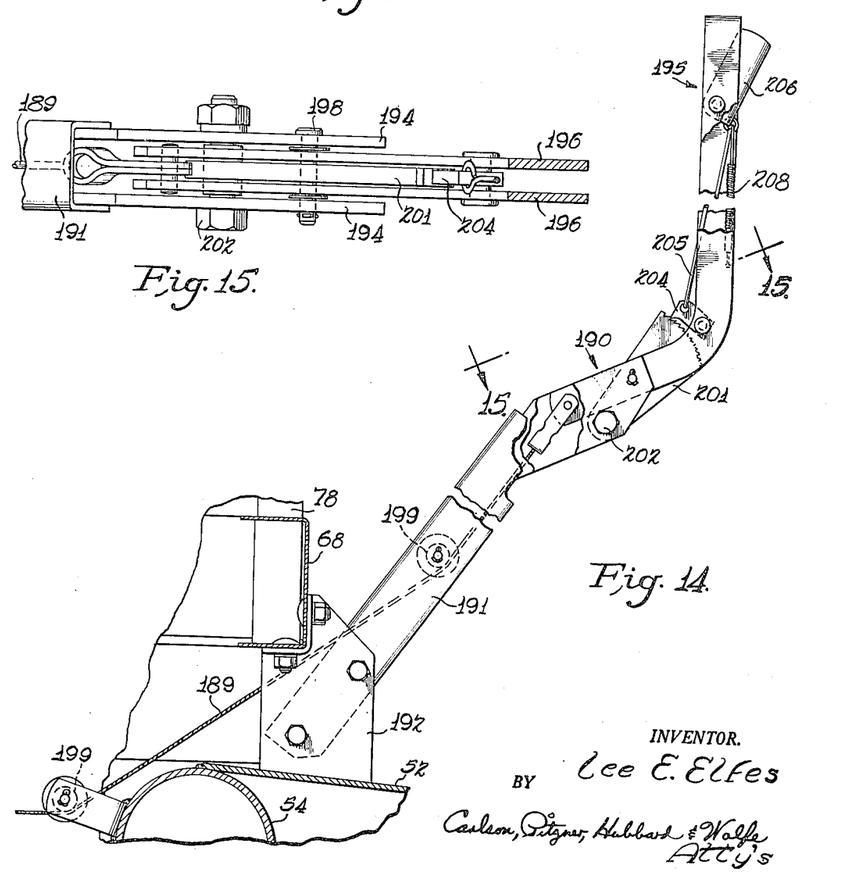
Fig. 14 is an enlarged fragmentary elevational sectional view showing the arrangement of the brake actuator or lever.
Fig. 15 is a fragmentary enlarged sectional view taken generally along a line 15—15 in Fig. 14.

The illustrated trailer is equipped with a brake system 184 (Figs. 13-15), comprising suitable wheel brakes (not shown) operated by arms 186. Individual cables 187 lead from the arms 186 to and equalizer lever 188, which is connected to a main brake cable 189.

In order that the tractor driver may easily be able to apply the trailer brakes, the brake system 184 is provided with an actuating mechanism 190 within easy reach of the driver's seat on the tractor. In this instance the actuating mechanism comprises a tubular supporting arm 191 extending upwardly and forwardly at a slanting angle from the front end of the trailer. At its lower end the supporting arm 191 is rigidly secured to the front border channel 68 by means of a bracket 192. Fixed to the upper end of the tubular support 191 is a pair of horizontally spaced supporting members 194. A U-shaped brake lever 195 having two arms or side members 196 is mounted between the supporting members 194 by means of a pivot pin 198. The main brake cable 189 is trained over a pair of guides 199 and pivotally connected to the lower end of the brake lever. To provide for latching the brake lever 195, a ratchet sector plate 201 is mounted on the pivot pin 198 between the brake lever arms 196. Extending through the supporting members 194 and the ratchet sector plate 201 is a pivot bolt 202 which fixes the ratchet plate in place on the supporting arm 191. A pawl 204, engageable with the ratchet sector 201, is pivoted between the arms 196 of the brake lever 195 and is connected by means of a pull rod 205 to a release lever 206 which is biased into latching position by means of a contractile spring 208. The brakes are applied by pulling the brake lever 195 forwardly to the desired extent, whereupon the ratchet sector 201 and the pawl 204 will maintain the setting. Releasing of the brakes is accomplished by squeezing the release lever 206 and allowing the brake lever 195 to return rearwardly.

While the operation and use of the trailer will be apparent from the foregoing description, it may be helpful to offer a brief summary. The trailer may be hitched to the tractor 20 simply by lowering the hook 36, backing the tractor to move the hook under the hitching ring 56 on the trailer, and raising the hook by operation of the power lift device on the tractor, all as fully disclosed and claimed in the above-mentioned Lee E. Elfes application Ser. No. 412,446. Since the trailer is forwardly overbalanced, the weight of the trailer and its load will be applied in part to the rear wheels 26 of the tractor and thereby will increase the tractive effort which may be developed by the tractor.

When it is desired to run the conveyor 106 and thereby discharge the load from the rear end of the trailer, the tail board 76 is opened by grasping the handle 104, raising the tail board clear of the stop plates 99, and swinging the lower edge of the tail board rearwardly about the pivots 95. If complete removal of the tail board is desired, the pivots 95 may be lifted out of the notches 98 in the brackets 96. To start the conveyor 106, the power take-off shaft 42 on the tractor 20 is set in motion. This will result in rotation of the connecting shaft 124, the crank shaft 130 and the crank 142, and will cause reciprocation of the connecting rod 144. As a result, the ratchet arms 151 will be oscillated through a predetermined angle, corresponding to the span of two teeth on the ratchet wheel 149. However, with the selector shield 160 and the selector arm 161 in the position shown in Fig. 8, the shield 160 will withhold the pawl 150 from the ratchet wheel 149 so that the arms 151 will oscillate idly without advancing the ratchet wheel. Shifting the shield 160 until the detent member 168 engages the notch 166 will permit the ratchet pawl 150 to engage the ratchet wheel 149 during approximately one-half of the oscillatory swing of the arms 151 so that the ratchet wheel will be advanced one tooth for each cycle of oscillation. This will result in half-speed operation of the conveyor 106. Full speed operation may be obtained by shifting the shield 160 until the detent member 168 engages the notch 165, whereupon the pawl 150 will advance the ratchet wheel 149 two teeth during each cycle of operation. The chains 110 thus will be advanced intermittently accordingly, the conveyor slats 108 will push the load out of the rear end of the trailer. If an overload should occur, the slip clutch 131 will prevent damage to any component of the conveyor.

The conveyor 106 is readily detachable from the trailer, and hence may be marketed as a separate attachment. Likewise the side boards 74, the front board 75 and the tail board 76 may readily be removed and may be sold separately from the basic flat bed trailer. With the side boards in place, stakes may be inserted in the tubular uprights 78 to increase the effective height of the side boards.

It will be apparent that the trailer is readily adaptable to a wide range of services, ranging from the haulage of hay bales and vegetable baskets to the haulage and power unloading of grain and other loose materials.

I claim as my invention:

1. In a vehicle, the combination comprising a bed having a transverse slot at one end, a pair of flexible endless conveyor elements looped above and below said bed in laterally spaced relation and extending through said slot, means extending between said flexible conveyor elements for movement therewith to convey materials along said bed, a flap extending over said slot to prevent escape of materials therethrough, and a pair of side panels detachably mounted on said bed and including respective members overhanging said flexible conveyor elements to shield said flexible elements from loose materials on said bed and to hold said flexible elements down adjacent the top of said bed.

2. In a trailer for attachment to a tractor having a rearwardly extending power take-off shaft, the combination comprising a bed, front and rear conveyor shafts journaled under said bed at opposite ends thereof, each of said shafts having a pair of sprockets mounted thereon, a pair of conveyor chains supported on said sprockets and looped over and under said bed, a plurality of transverse members connected to said chains and extending therebetween for movement therewith along said bed to convey materials therealong, a ratchet wheel mounted on said rear shaft, a ratchet arm swingably mounted on said shaft, a ratchet pawl pivoted on said arm and biased toward said ratchet wheel, means connectable to the power take-off shaft for oscillating said ratchet arm through a predetermined angle, a non-retrograde pawl biased against said ratchet wheel to prevent retrograde movement thereof, a selector arm pivoted on said rear shaft, and a selector shield mounted on said selector arm and moveable therewith between said ratchet pawl and said ratchet wheel for selectively withholding said ratchet pawl from said wheel for a portion of said angle.

3. A farm trailer adapted to receive a conveyor attachment comprising in combination a pair of longitudinal beams disposed in laterally spaced relation and supporting near their rear ends by a pair of ground wheels, a flat generally rectangular cargo platform on said beams having a metal border frame with a set of floor boards flush with its top, said platform defining a slotted opening between the front of said border frame and said floor boards for accommodating the passage of an endless conveyor rearwardly over the platform and forwardly under the platform, a tractor hitch at the forward end of the trailer, front end side panels on said platform, and support brackets for said side panels maintaining a spacing between the platform and the bottom edge of each panel to define a recess for the passage of a flexible conveyor chain therealong.

4. A farm trailer adapted to receive a conveyor attachment comprising in combination a pair of longitudinal beams disposed in laterally spaced relation and supporting near their rear ends by a pair of ground wheels, a flat generally rectangular cargo platform on said beams having a metal border frame with a set of floor boards flush with its top, said platform defining a slotted opening between the front of said border frame and said floor boards for accommodating the passage of an endless conveyor rearwardly over the platform and forwardly under the platform, a tractor hitch at the forward end of the trailer, front and side panels on said platform, support brackets for said side panels maintaining a spacing between the platform and the bottom edge of each panel to define a recess for the passage of a flexible conveyor chain therealong, and a tail gate at the end of said platform, said gate being recessed at its lower corner portions to permit the passage of conveyor chains.

5. A farm trailer for holding and unloading materials comprising a flat rectangular cargo platform having a transverse slotted opening near its front end, a pair of ground wheels near the rear end on the trailer platform, a tractor hitch at the forward end of the platform, a front pair of sprockets detachably mounted near the front corners of said platform at said slotted opening a rear pair of sprockets detachably mounted at the rear corners of said platform, a pair of endless conveyor chains carried on said front and rear pairs of sprockets with the upper chain flights running along the top surface of the platform from the slotted opening to the rear platform edge and with the lower chain flights returning below the platform, transverse feeder bars connected between corresponding portions of said chains for conveying materials rearwardly along the platform, a front panel detachably mounted on the front edge of the platform, a flexible cover flap for said transverse opening supported from said front panel, a pair of side panels detachably mounted along the sides of the platform, said side panels being recessed along their lower facing edges to confine the respective upper chain flights, and means adapted to be detachably coupled to a tractor for driving said conveyor chains.

6. In a trailer in combination a frame comprising a pair of longitudinal beams rigidly connected by a series of cross beams secured to the upper edges of the longitudinal beams, bearing blocks removably secured to said longitudinal beams adjacent their forward edges, a shaft journalled in said bearing blocks, sprockets on said shafts, an endless chain conveyor adapted to be looped around said frame and running on said sprockets, a plurality of elongated floor members extending longitudinally of said frame and resting on said cross beams to define a flat generally rectangular platform with its top surface disposed at a level to accommodate the upper run of said conveyor, said longitudinal floor members terminating rearwardly of said bearing blocks, and a pair of floor members alternatively mountable to extend transversely of said frame across the forward ends of said longitudinal members, one of said pair of members being dimensioned to define a transverse slot at the end of the platform for the passage of said conveyor, the other of said members being dimensioned to close the slot and present an unbroken platform surface over the area normally occupied by said bearing blocks, said shaft and said sprockets.

References Cited in the file of this patent
UNITED STATES PATENTS

| | | |
|---|---|---|
| 1,748,635 | Carriger | Feb. 25, 1930 |
| 1,839,603 | Shaw | Jan. 5, 1932 |
| 1,884,333 | Standish | Oct. 25, 1932 |
| 2,256,037 | Reid | Sept. 16, 1941 |
| 2,387,093 | Schmied | Oct. 16, 1945 |
| 2,478,583 | Hybbert | Aug. 9, 1949 |
| 2,482,014 | Maurits | Sept. 13, 1949 |
| 2,504,623 | Barker | Apr. 18, 1950 |
| 2,609,952 | Balzer et al. | Sept. 9, 1952 |
| 2,682,959 | Regier | July 6, 1954 |